(12) United States Patent
Xu et al.

(10) Patent No.: US 10,003,462 B2
(45) Date of Patent: Jun. 19, 2018

(54) KEY GENERATING METHOD AND APPARATUS

(71) Applicant: Huawei Technologies Co., Ltd., Shenzhen (CN)

(72) Inventors: Lei Xu, Shenzhen (CN); Zhengde Zhai, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 14/867,106

(22) Filed: Sep. 28, 2015

(65) Prior Publication Data

US 2016/0020902 A1 Jan. 21, 2016

Related U.S. Application Data

(63) Continuation of application No. PCT/CN2014/075369, filed on Apr. 15, 2014.

(30) Foreign Application Priority Data

Oct. 28, 2013 (CN) .......................... 2013 1 0518424

(51) Int. Cl.
*H04L 9/08* (2006.01)
*G06K 9/52* (2006.01)
*G06T 3/40* (2006.01)
*G06K 9/46* (2006.01)

(52) U.S. Cl.
CPC .............. *H04L 9/0866* (2013.01); *G06K 9/52* (2013.01); *G06T 3/40* (2013.01); *H04L 9/0861* (2013.01); *G06K 2009/4666* (2013.01); *G06T 2207/20021* (2013.01)

(58) Field of Classification Search
CPC ....... H04L 9/0866; H04L 9/0861; G06K 9/52; G06T 3/40
See application file for complete search history.

(56) References Cited

U.S. PATENT DOCUMENTS

| 5,559,961 | A | | 9/1996 | Blonder | |
|---|---|---|---|---|---|
| 5,732,138 | A | * | 3/1998 | Noll | ........................ G06F 7/582 380/28 |
| 6,011,849 | A | * | 1/2000 | Orrin | ...................... H04L 9/065 380/37 |

(Continued)

FOREIGN PATENT DOCUMENTS

| CN | 1184294 A | 6/1998 |
|---|---|---|
| CN | 1273499 A | 11/2000 |

(Continued)

OTHER PUBLICATIONS

Chhajed et al., "Efficient Embedding in B&W Picture Images", Apr. 2010, 2nd IEEE International Conference on Information Management and Engineering, pp. 525-528 (Year: 2010).*

(Continued)

*Primary Examiner* — Kenneth W Chang
(74) *Attorney, Agent, or Firm* — Conley Rose, P.C.

(57) ABSTRACT

A key generating method and apparatus, where the method includes acquiring complete picture data of a complete picture; displaying a partial picture of the complete picture in a display window; capturing a first picture from the partial picture, and generating first picture data of the first picture; and generating a key according to the first picture data.

4 Claims, 2 Drawing Sheets

(56) References Cited

U.S. PATENT DOCUMENTS

| | | | |
|---|---|---|---|
| 6,307,955 B1* | 10/2001 | Zank | G06K 9/00154 380/30 |
| 6,684,087 B1* | 1/2004 | Yu | G06T 3/4038 455/414.3 |
| 7,222,235 B1* | 5/2007 | Mitsui | G06F 17/211 380/28 |
| 8,881,251 B1* | 11/2014 | Hilger | H04L 63/083 713/183 |
| 2002/0191091 A1* | 12/2002 | Raynor | H04N 1/32101 348/239 |
| 2004/0086115 A1 | 5/2004 | Laih et al. | |
| 2006/0013389 A1* | 1/2006 | Harrison | H04L 9/3073 380/30 |
| 2007/0092075 A1* | 4/2007 | Laih | H04K 1/00 380/30 |
| 2008/0263361 A1 | 10/2008 | Dutta et al. | |
| 2009/0136032 A1 | 5/2009 | Tamura | |
| 2010/0180336 A1* | 7/2010 | Jones | H04L 9/3226 726/19 |
| 2010/0287382 A1 | 11/2010 | Gyorffy et al. | |
| 2012/0025462 A1* | 2/2012 | Knowlton | A63F 9/10 273/157 R |
| 2012/0198546 A1 | 8/2012 | Cheswick | |

FOREIGN PATENT DOCUMENTS

| | | |
|---|---|---|
| CN | 1333973 A | 1/2002 |
| CN | 1431622 A | 7/2003 |
| CN | 101448068 A | 6/2009 |
| CN | 102663282 A | 9/2012 |
| EP | 1998306 A1 | 12/2008 |

OTHER PUBLICATIONS

Santhi, B., et al., "A Novel Cryptographic Key Generation Method Using Image Features," Research Journal of Information Technology, vol. 4, No. 2, Jun. 30, 2012, pp. 88-92.

Ogiela, M., et al., "Image Based Crypto-Biometric Key Generation," Third International Conference on Intelligent Networking and Collaborative Systems, 2011, pp. 673-678.

Foreign Communication From a Counterpart Application, PCT Application No. PCT/CN2014/075369, English Translation of International Search Report dated Jul. 29, 2014, 2 pages.

Foreign Communication From a Counterpart Application, PCT Application No. PCT/CN2014/075369, Written Opinion dated Jul. 29, 2014, 4 pages.

Machine Translation and Abstract of Chinese Publication No. CN102663282, dated Sep. 12, 2012, 9 pages.

Foreign Communication From a Counterpart Application, Chinese Application No. 201310518424.2, Chinese Office Action dated Apr. 19, 2017, 8 pages.

Foreign Communication From a Counterpart Application, Chinese Application No. 201310518424.2, Chinese Office Action dated Nov. 27, 2017, 8 pages.

Ming-Quan, Z., et al., "An 3-DES Key Encryption Method Generated by Iris Image," Information Security, Sep. 29, 2012, 3 pages.

English Translation of Ming-Quan, Z., et al., "An 3-DES Key Encryption Method Generated by Iris Image," Information Security, Sep. 29, 2012, 5 pages.

Foreign Communication From A Counterpart Application, Chinese Application No. 201310518424.2, Chinese Office Action dated Apr. 20, 2018, 8 pages.

\* cited by examiner

KEY GENERATING METHOD AND APPARATUS

CROSS-REFERENCE TO RELATED APPLICATIONS

This application is a continuation of International Application No. PCT/CN2014/075369, filed on Apr. 15, 2014, which claims priority to Chinese Patent Application No. 201310518424.2, filed on Oct. 28, 2013, both of which are hereby incorporated by reference in their entireties.

TECHNICAL FIELD

The present disclosure relates to the field of mobile communications, and in particular, to a key generating method and apparatus.

BACKGROUND

With the popularization of smart devices, how to protect data in smart devices becomes a very important issue. Encryption is an effective method for implementing data protection. When an encryption system is deployed in a smart device, one of key issues is to ensure security of an encrypted key. Generally, to protect an encrypted key, the key cannot be stored in a plaintext format in a smart device; instead, each time a key is needed, a key is generated by using input of a user in interaction with the user.

In the prior art, a smart device provides an interface for a user, the user enters an American Standard Code for Information Interchange (ASCII) character string on the interface, and the character string and a salt value selected by the smart device are connected and then input to a key generating function, to generate a key; or a smart device provides an interface for a user, the user selects a group of pictures on the interface, where each picture is assigned a unique identifier (ID), and the IDs of the pictures selected by the user and a salt value are used as input to a key generating function, to generate a key.

Therefore, in the method of using a character string or a group of sequential pictures as input to a key generating function in the prior art, a user usually needs to memorize input of the user, which brings inconvenience for use by the user, and an input entropy of the key generating function is relatively small, which is prone to an attack by an attacker.

SUMMARY

Embodiments of the present disclosure provide a key generating method and apparatus, which can bring convenience for memorization and use by a user and can also improve security of a key.

According to a first aspect, an embodiment of the present disclosure provides a key generating method, where the method includes acquiring complete picture data of a complete picture; displaying a partial picture of the complete picture in a display window; capturing a first picture from the partial picture, and generating first picture data of the first picture; and generating a key according to the first picture data.

In a possible implementation manner, after the displaying of a partial picture of the complete picture in a display window, the method further includes dividing the partial picture into equal squares and moving, using the square as a movement unit, the complete picture until the display window displays a needed partial picture.

In a possible implementation manner, capturing a first picture from the partial picture, and generating first picture data of the first picture includes capturing a part of the partial picture as the first picture, and generating the first picture data of the first picture; or capturing the entire partial picture as the first picture, and generating the first picture data of the first picture.

In a possible implementation manner, capturing a part of the partial picture or the entire partial picture as the first picture, and generating the first picture data of the first picture includes acquiring a region selected by a user in the partial picture, and using a picture corresponding to the region in the partial picture as the first picture; and representing the region selected by the user as a square set, and connecting, according to a specified rule, pieces of image data that correspond to all squares in the square set to form a binary string, where the binary string is the first picture data.

In a possible implementation manner, representing the region selected by the user as a square set includes the region selected by the user being a closed region; sequentially acquiring each square in the display window, and when the square is included in the closed region, the square belongs to the square set; or when only a part of the square is included in the closed region, computing an area of the part of the square included in the closed region, and when the area is greater than a first threshold, the square belongs to the square set.

In a possible implementation manner, representing the region selected by the user as a square set includes the region selected by the user being a closed region; sequentially acquiring each square in the display window, and when four sides of the square and the closed region have more than two intersection points, the square belongs to the square set; or when four sides of the square and the closed region have two intersection points and the two intersection points are on a same side of the square, the square belongs to the square set; or when four sides of the square and the closed region have two intersection points and the two intersection points are not on a same side of the square, computing an area of a trapezoid that is formed after the two intersection points are connected, and when the area is greater than a second threshold, the square belongs to the square set.

In a possible implementation manner, generating a key according to the first picture data includes performing hash computing, in which a specified quantity of iteration times is i, on the first picture data, to generate the key, where i is a natural number.

According to a second aspect, an embodiment of the present disclosure further provides a key generating apparatus, wherein the apparatus includes an acquiring unit, a display unit, a first processing unit, and a generating unit; wherein the acquiring unit is configured to acquire complete picture data of a complete picture, and send the complete picture data to the display unit; wherein the display unit is configured to receive the complete picture data sent by the acquiring unit, display a partial picture of the complete picture in a display window, and send the partial picture to the first processing unit; wherein the first processing unit is configured to receive the partial picture sent by the display unit, capture a first picture from the partial picture, and generate first picture data of the first picture; and wherein the generating unit is configured to generate a key according to the first picture data.

In a possible implementation manner, the apparatus further includes a second processing unit configured to divide the partial picture into equal squares and move, using the square as a movement unit, the complete picture until the display window displays a needed partial picture.

In a possible implementation manner, the first processing unit is configured to capture a part of the partial picture as the first picture, and generate the first picture data of the first picture; or capture the entire partial picture as the first picture, and generate the first picture data of the first picture.

In a possible implementation manner, the first processing unit is configured to acquire a region selected by a user in the partial picture, and use a picture corresponding to the region in the partial picture as the first picture; and represent the region selected by the user as a square set, and connect, according to a specified rule, pieces of image data that correspond to all squares in the square set to form a binary string, where the binary string is the first picture data.

In a possible implementation manner, the first processing unit is configured to, the region selected by the user being a closed region, sequentially acquire each square in the display window, and when the square is included in the closed region, the square belongs to the square set; or when only a part of the square is included in the closed region, compute an area of the part of the square included in the closed region, and when the area is greater than a first threshold, the square belongs to the square set.

In a possible implementation manner, the first processing unit is configured to, the region selected by the user being a closed region, sequentially acquire each square in the display window, and when four sides of the square and the closed region have more than two intersection points, the square belongs to the square set; or when four sides of the square and the closed region have two intersection points and the two intersection points are on a same side of the square, the square belongs to the square set; or when four sides of the square and the closed region have two intersection points and the two intersection points are not on a same side of the square, compute an area of a trapezoid that is formed after the two intersection points are connected, and when the area is greater than a second threshold, the square belongs to the square set.

In a possible implementation manner, the generating unit is configured to perform hash computing, in which a specified quantity of iteration times is i, on the first picture data, to generate the key, where i is a natural number.

In the embodiments of the present disclosure, complete picture data, which is sent by a picture selector, of a complete picture is received; a partial picture of the complete picture is displayed in a display window according to the complete picture data; a first picture is captured from the partial picture, and first picture data of the first picture is generated; and the first picture data is sent to a key extractor, such that the key extractor generates a key according to the first picture data. In this way, convenience is brought for memorization and use by a user, and by using a characteristic region of a picture as input to a key generating function, it can be ensured that an input entropy of the key generating function is large enough, which can improve security of a key.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A key generating method and apparatus in the embodiments of the present disclosure solve a problem that when an encrypted key is generated, a user needs to memorize input of the user, which brings inconvenience for use by a user, and an input entropy of a key generating function is relatively small, and provide a manner of generating a key by using an image characteristic as input to a key generating function, such that when a key is generated, a user only needs to memorize characteristic regions on some pictures and does not need to memorize a relatively long character string or related pictures and a sequence thereof.

Figure 1:
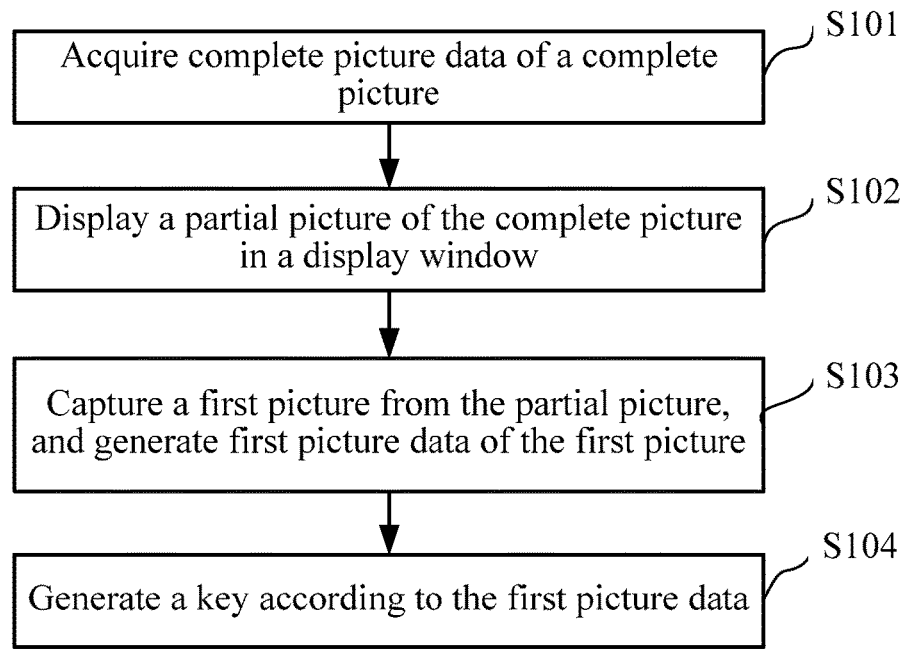
FIG. 1 is a schematic flowchart of a key generating method according to Embodiment 1 of the present disclosure.

FIG. 1 is a schematic flowchart of a key generating method according to Embodiment 1 of the present disclosure. The method may be applied to any electronic device having a touchscreen. The electronic device may be a mobile terminal such as a mobile phone, a tablet, or a laptop, or may be a fixed terminal such as a desktop computer or a server. As shown in FIG. 1, the method provided in this embodiment includes the following steps.

Step 101: Acquire complete picture data of a complete picture.

Figure 2:
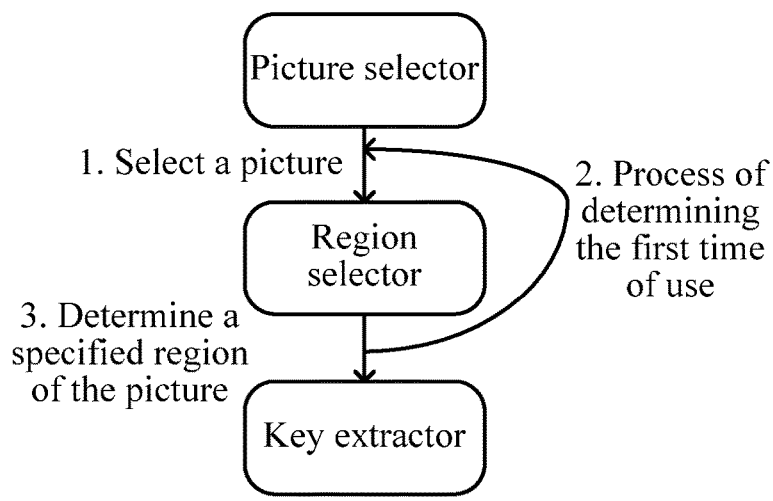
FIG. 2 is a schematic principle diagram of a key generating method according to the present disclosure.

Referring to a schematic principle diagram of a key generating method according to the present disclosure shown in FIG. 2, in FIG. 2, a terminal includes a picture selector, a region selector, and a key extractor, and this method is executed by the region selector. A user selects one or more complete pictures by using the picture selector, and then the picture selector sends complete picture data of the one or more complete pictures selected by the user to the region selector, where the region selector includes a display window.

Step 102: Display a partial picture of the complete picture in a display window.

It should be noted that a complete picture selected by a user is generally large; therefore, the display window in the region selector can only display a partial picture of the complete picture. After the region selector receives the complete picture data of the complete picture selected by the user, the display window displays a partial picture of the complete picture, where the partial picture, which is displayed in the display window, of the complete picture is divided into equal squares, and sizes of the squares are adjustable. When the user moves the complete picture on a screen to display a needed partial picture in the display window, a unit in which the user moves the complete picture each time is one square.

Step 103: Capture a first picture from the partial picture, and generate first picture data of the first picture.

When displaying a partial picture needed by the user in the display window by moving the complete picture, the user may select one or more regions on the partial picture with a finger or by using another device. Preferably, the selected region is a continuous closed region, and is usually irregular. The region selector uses a part of a partial picture or an entire partial picture corresponding to the continuous closed region selected by the user on the partial picture as a first picture, and generates first picture data of the first picture.

It should be noted that the region selector generates the first picture data of the first picture in a manner of representing the region selected by the user as a square set S. Representing the region selected by the user as a square set S includes, when the display window divides the partial picture of the complete picture into equal squares for display, and when a continuous closed region selected by the user on the partial picture is acquired, sequentially acquiring squares in the display window, and when a square is included in the continuous closed region, recording the square in the square set S; or when only a part of a square is included in the continuous closed region, computing an area of the part of the square included in the continuous closed region, and when the area of the part of the square included in the continuous closed region is greater than a first threshold, the square belongs to the square set S; and the rest can by deduced by analogy, until determining is performed for all the squares in the display window, where a value of the first threshold is determined according to an accuracy requirement selected by the user; for example, when the user has a high requirement for security, the first threshold may be set to a larger value, that is, may be set to 80% of an area of the entire square; when the user has a high requirement on convenience, the first threshold may be set to a smaller value, that is, may be set to 50% of an area of the entire square.

In another implementation manner, representing the region selected by the user as a square set S may also include, when the display window divides the partial picture of the complete picture into equal squares for display, and when a continuous closed region selected by the user on the partial picture is acquired, sequentially acquiring squares in the display window, and when four sides of a square and the continuous closed region have more than two intersection points, the square belongs to the square set S; or when four sides of the square and the continuous closed region have two intersection points and the two intersection points are on a same side of the square, the square belongs to the square set S; or when four sides of the square and the continuous closed region have two intersection points and the two intersection points are not on a same side of the square, computing an area of a trapezoid that is formed after the two intersection points are connected, and when the area of the trapezoid is greater than a second threshold, the square belongs to the square set S; and the rest can by deduced by analogy, until determining is performed for all the squares in the display window, where a method for determining a value of the second threshold is same as the method for determining a value of the first threshold.

After the square set S is obtained, pieces of image data corresponding to all squares in the square set S are connected according to a specified rule (for example, according to a top-to-bottom and left-to-right sequence of the squares in S in the display window), to form a binary string, and the binary string is the first picture data.

Step 104: Generate a key according to the first picture data.

The region selector sends the generated first picture data to the key extractor, and the key extractor performs, using a secure hash function according to a preset quantity of iteration times, hash computing in which the specified quantity of iteration times is i on the received first picture data, to generate a key, where i is a natural number.

It should be noted that when the region selector determines that it is the first time a key is generated on the terminal, after the region selected by the user is converted into the square set S by using the foregoing process, it is required that the user selects a region on the partial picture again, and after the region selected by the user at the second time is converted into a square set S', the first picture data is sent to the key extractor only when S=S'. The region selector may determine, according to a flag, whether it is the first time a key is generated on the terminal, that is, set the flag to 0 in an initial state and set the flag to 1 when the user sets a key for the first time, and when learning that a value of the flag is 1, the region selector can determine that it is the first time a key is generated on the terminal.

It should be noted that in this embodiment of the present disclosure, the key generating method is described using one region selected by a user on one picture as an example, but the present disclosure is not limited thereto; this method may also be used to process multiple regions selected by a user on multiple pictures, and a key is generated by using processed data as input to a key generating function. Besides, a salt value is not needed in a process of generating a key by using the key generating method provided in the present disclosure.

Figure 3:
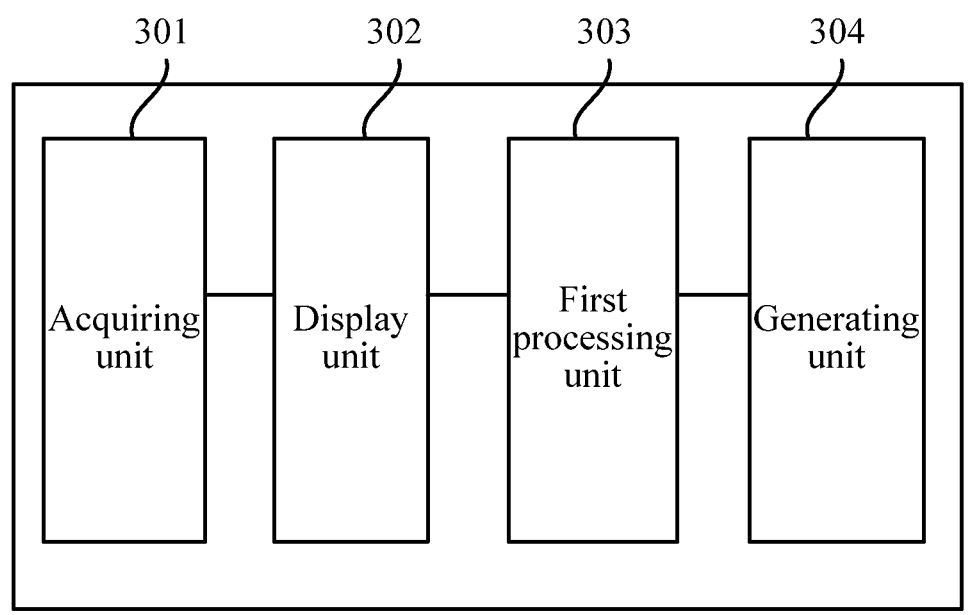
FIG. 3 is a schematic diagram of a key generating apparatus according to Embodiment 2 of the present disclosure.

FIG. 3 is a schematic diagram of a key generating apparatus according to Embodiment 2 of the present disclosure. As shown in FIG. 3, the apparatus provided in this embodiment includes an acquiring unit 301, a display unit 302, a first processing unit 303, and a generating unit 304.

The acquiring unit 301 is configured to acquire complete picture data of a complete picture and send the complete picture data to the display unit 302.

A user selects one or more complete pictures by using a picture selector, then the picture selector sends complete picture data of the one or more complete pictures selected by the user to a region selector, and the region selector acquires the complete picture data by using the acquiring unit 301.

The display unit 302 is configured to receive the complete picture data sent by the acquiring unit 301, display a partial picture of the complete picture in a display window, and send the partial picture to the first processing unit 303.

It should be noted that a complete picture selected by a user is generally large; therefore, the display window in the region selector can only display a partial picture of the complete picture.

The first processing unit 303 is configured to receive the partial picture sent by the display unit 302, capture a first picture from the partial picture, and generate first picture data of the first picture.

In a specific embodiment of the present disclosure, the first processing unit 303 is configured to capture a part of the partial picture as the first picture, and generate the first picture data of the first picture; or capture the entire partial picture as the first picture, and generate the first picture data of the first picture. Further, the first processing unit 303 is configured to acquire a region selected by a user in the partial picture and use a picture corresponding to the region in the partial picture as the first picture; and represent the region selected by the user as a square set, and connect, according to a specified rule, pieces of image data that correspond to all squares in the square set to form a binary string, where the binary string is the first picture data.

In the foregoing embodiment, assuming that the region selected by the user is a closed region, representing the region selected by the user as a square set includes sequentially acquiring each square in the display window, and when the square is included in the closed region, the square belongs to the square set; or when only a part of the square is included in the closed region, computing an area of the part of the square included in the closed region, and when the area is greater than a first threshold, the square belongs to the square set; optionally, representing the region selected by the user as a square set may also include acquiring a region selected by a user in the partial picture, and using a picture corresponding to the region in the partial picture as the first picture; and representing the region selected by the user as a square set, and connecting, according to a specified rule, pieces of image data that correspond to all squares in the square set to form a binary string, where the binary string is the first picture data.

The generating unit 304 is configured to generate a key according to the first picture data.

In a specific embodiment of the present disclosure, the generating unit 304 is configured to send the first picture data to a key extractor, such that the key extractor performs hash computing in which a specified quantity of iteration times is i on the first picture data, to generate the key, where i is a natural number.

Optionally, the apparatus further includes a second processing unit configured to divide the partial picture into equal squares and move, using the square as a movement unit, the complete picture until the display window displays a needed partial picture.

The method provided in Embodiment 1 of the present disclosure is embedded in the apparatus provided in this embodiment of the present disclosure. Therefore, a specific working process of the apparatus provided in the present disclosure is not described in detail herein.

In Embodiment 2 of the present disclosure, the acquiring unit 301 acquires complete picture data of a complete picture; the display unit 302 displays a partial picture of the complete picture in a display window; the first processing unit 303 captures a first picture from the partial picture and generates first picture data of the first picture; and the generating unit 304 generates a key according to the first picture data. In this way, convenience is brought for memorization and use by a user, and by using a characteristic region of a picture as input to a key generating function, it can be ensured that an input entropy of the key generating function is large enough, which can improve security of a key.

It can be seen that the key generating method and apparatus in the embodiments of the present disclosure solve a problem that when an encrypted key is generated, a user needs to memorize input of the user, which brings inconvenience for use by a user, and an input entropy of a key generating function is relatively small, and provide a manner of generating a key by using an image characteristic as input to a key generating function, such that when a key is generated, a user only needs to memorize characteristic regions on some pictures and does not need to memorize a relatively long character string or related pictures and a sequence thereof.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A key generating method for securing an electronic device, wherein the method comprises:
   receiving, by the electronic device, a selection of a complete picture;
   displaying at least a partial picture of the complete picture in a display window of the electronic device;
   receiving an input;
   acquiring a region in the partial picture based, at least in part, on the input;
   representing the region as a square set;
   forming a string based, at least in part, on squares in the square set;
   generating a key based, at least in part, on the string;
   encrypting unencrypted data stored on the electronic device using the key; and
   decrypting encrypted data stored on the electronic device using the key,
   wherein acquiring the region comprises:
      detecting a closed region defined by the input;
      determining a first square is part of the region when the first square is entirely within the closed region;
      determining a portion of the first square within the region when the portion of the first square is within the closed region;
      determining the first square is part of the region when the portion of the first square is greater than a threshold; and
      determining the first square is not part of the region when the portion of the first square is less than a threshold.

2. The method of claim 1, wherein receiving the input comprises at least one of:
   receiving a touch at a touch screen of the electronic device; and
   receiving a command from an input device of the electronic device.

3. The method of claim 1, wherein forming the string comprises connecting all squares within the closed region to form the string.

4. The method of claim 1, wherein generating the key comprises performing a hash on the string.

* * * * *